United States Patent [19]

Giltnane

[11] Patent Number: 4,549,711
[45] Date of Patent: Oct. 29, 1985

[54] NON-CYLINDRICAL LEG SYSTEM PARTICULARLY USEFUL FOR UPHOLSTERED FURNITURE

[75] Inventor: Robert Giltnane, Athens, Tenn.

[73] Assignee: Plastics Industries, Inc., Athens, Tenn.

[21] Appl. No.: 558,900

[22] Filed: Dec. 7, 1983

[51] Int. Cl.⁴ ............................................. F16M 11/16
[52] U.S. Cl. .................................. 248/188; 248/188.8; 403/205
[58] Field of Search ...................... 248/188, 188.1, 677, 248/188.8, 188.4; 108/153, 150; 403/205, 231, 403

[56] References Cited

U.S. PATENT DOCUMENTS

| | | | |
|---|---|---|---|
| 404,284 | 5/1889 | Johnson | 411/544 X |
| 1,733,859 | 11/1928 | Brubaker . | |
| 1,776,534 | 9/1930 | Allen | 248/188 X |
| 1,800,132 | 5/1930 | Brubaker . | |
| 2,938,759 | 11/1957 | Mutchnik et al. . | |
| 2,965,161 | 12/1960 | Knoll | 248/188 X |
| 3,018,526 | 1/1960 | Riebel . | |
| 3,983,824 | 10/1976 | Birnbaum | 108/153 X |

FOREIGN PATENT DOCUMENTS

| | | | |
|---|---|---|---|
| 245923 | 5/1963 | Australia | 248/188 |
| 1366083 | 6/1964 | France | 248/188.8 |
| 2499175 | 8/1982 | France | 403/205 |
| 250420 | 4/1926 | United Kingdom | 248/188 |
| 617884 | 2/1949 | United Kingdom | 248/188.8 |
| 1010406 | 11/1965 | United Kingdom | 248/188 |

*Primary Examiner*—J. Franklin Foss
*Attorney, Agent, or Firm*—Kerkam, Stowell, Kondracki and Clarke

[57] ABSTRACT

A system for attaching non-cylindrical legs to upholstered seating-type furniture is disclosed wherein the frame of the furniture may have 90° corners or corners at other than 90° and the system includes means whereby the non-cylindrical legs may be simply aligned by the ultimate consumer.

Through the use of the system of the invention as much as a 30 percent saving in space is possible in shipping furniture from the factory to a retailer or a retailer to the ultimate customer.

Another aspect is that chairs and sofas may be manufactured having base platforms which are parallel to the ground and when the legs are attached to the frame the preferred 3.5° rearward slope is acquired by the furniture.

14 Claims, 6 Drawing Figures

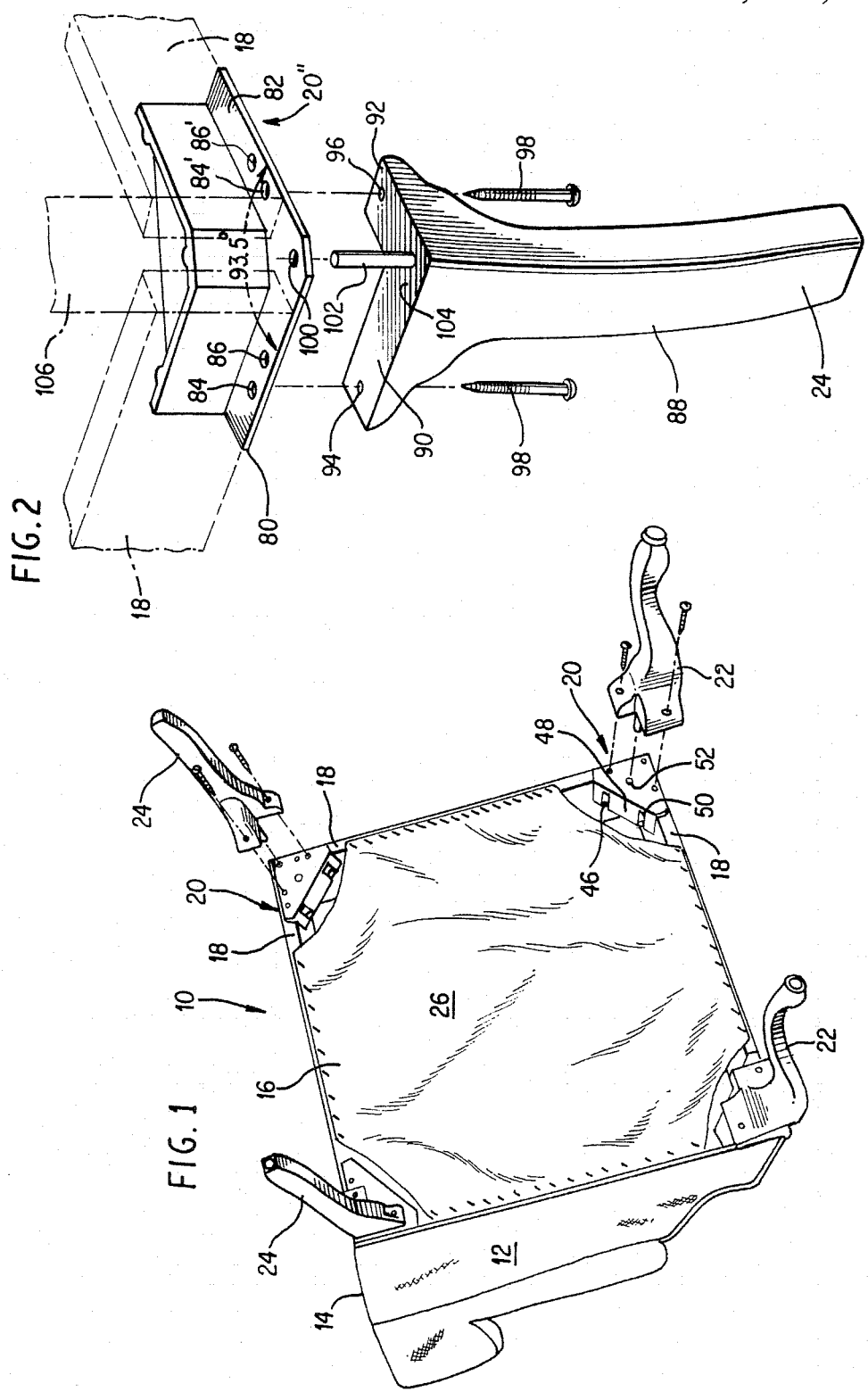

NON-CYLINDRICAL LEG SYSTEM PARTICULARLY USEFUL FOR UPHOLSTERED FURNITURE

BRIEF SUMMARY OF THE INVENTION

This invention relates to a system for attaching legs to seating furniture such as chairs and sofas and particularly to such a system wherein the legs are non-cylindrical and the furniture is upholstered prior to attachment of the legs.

Systems are known for attaching legs to furniture wherein brackets are employed which receive threaded studs so that the legs may be simply attached by the purchaser thereby saving substantial shipping space between the manufacturer and the retail outlet and the retail outlet and the ultimate consumer.

In the prior art the legs attached to such brackets or corner blocks are cylindrical so that alignment of the leg is not critical. Where non-cylindrical legs are employed the legs are usually installed by doweling and gluing at the factory and the furnture is shipped fully assembled.

By the system of the present invention non-cylindrical legs may be simply attached and aligned by the ultimate consumer and such legs may be attached to fully upholstered furniture such as sofas and chairs.

The invention may be generally defined as in an upholstered seating furniture having at least a frame, seat and back, a corner block attached to the frame at least at the front corners thereof. The assembly also includes a non-cylindrical leg for each corner block with each leg having a flat surface formed on the upper end thereof with an upstanding pin secured to the flat surface of each leg. The corner blocks are bored to receive at least the upstanding leg pin and a pair of screws. The assembly further includes bores in the upper end of each leg corresponding in position and diameter to the bores in its corner block.

In another aspect of the present invention the upstanding leg pin is threaded and receives a compression washer and the corner block is similarly threaded or receives a threaded insert whereby the legs are screw connected in part to the corner brackets and aligned by means of the compression washer.

In another aspect of the present invention the legs are molded of plastic and the corner brackets comprise plastic.

BRIEF DESCRIPTION OF THE DRAWING

The invention will be described in greater detail in reference to the accompanying drawing wherein:

FIG. 1 is a perspective view illustrating an upholstered chair associated with the novel corner blocks and leg system of the present invention;

FIG. 2 is an enlarged fragmentary exploded view of a rear corner of a seating furniture showing the relationship between the wood rails, a corner block and a non-cylindrical leg wherein the corner block forms an angle of 93.5°;

DETAILED DESCRIPTION

Figure 3:
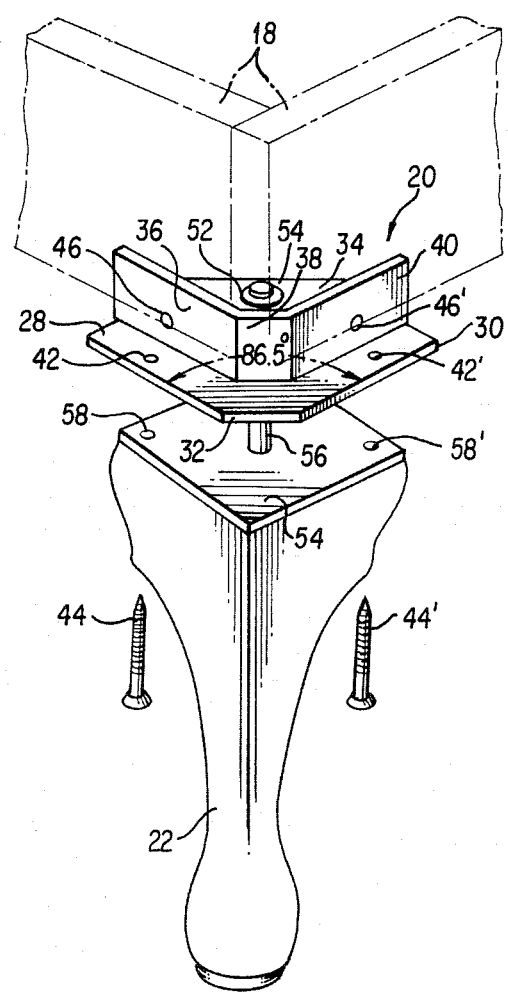
FIG. 3 is a fragmentary exploded view of a front corner of a seating furniture illustrating the relationship between the wood rail, corner block, and a Queen Anne style leg.

Referring to the drawings 10 generally designates a typical upholstered Queen Anne type chair comprising sides 12 back 14 and bottom 16. The bottom of the chair is formed by wooden rails 18 which are joined or reinforced at the corners by corner brackets generally designated 20. To the corner brackets are releasably attached front and rear non-cylindrical legs 22 and 24.

The chair 10 is upholstered on its sides, arm, back and seat and a dust cover 26 is attached to the bottom of the side-rail 18 except in the zone of the corner blocks 20.

Referring more particularly to FIGS. 1 and 3 the corner block 20 comprises a cast element having a pair of side rails 28 and 30 which intersect each other at an angle of 86.5°. In the zone of intersection the side rails 28 and 30 are beveled as at 32. The width of the flanges 28 and 30 are such that the side rails 18 forming the base frame of the chair can be firmly seated on the rail. The corner bracket 20 also includes a generally triangularly configured upstanding portion 34 having faces 36, 38 and 40 at right angles to the plane of the rails 28 and 30 and the beveled or chamfered portion 32 to thus form back edge supports for the wooden side rails 18.

The corner bracket is bored as at 42 and 42' to receive the pair of attaching screws 44 and 44' which pass through the front leg 22 and the bores 42 and 42' and seat in the wooden rails 18. Also the corner bracket is bored as at 46 and 46' to receive screws from the back edge 48 which pass through the center block portion 34 and into the back surfaces of the wooden base rails 18. Where desired the openings 46 and 46' for the wood screws may be recessed as at 50 FIG. 1 in the back wall 48 so that the heads of the screws will be counter sunk.

The assembly also includes a cylindrical opening 52 which passes completely through the bridge portion 54 of the bracket.

The leg 22 as illustrated in, for example, FIG. 3 is non-cylindrical and includes a flat top portion 54 which flat top portion carries a pin 56 which projects upwardly and the pin is so positioned that when the leg is placed in a proper position the pin is aligned with the opening 52 and the pair of bores 58 and 58' which receive the screws 44 and 44' are aligned with the openings 42 and 42' in the wing or rail portions 28 and 30 of the bracket 20.

During manufacture of the chair the corner bracket 20 is installed at at least the front corners of the chair or sofa as illustrated in FIG. 1 and retained in said position by screws passing through the bracket via openings 46 and 46' and embedding in the wooden side rail 18 of the chair. After the chair is fully upholstered and/or shipped to a retailer or a customer the non-cylindrical front legs and the non-cylindrical rear legs are attached. In attaching the front legs the pin 56 is slipped into the bore 52 and the pair of wood screws 44 and 44' prevent twisting movement once they are in position and screwed into the rails 18.

It will be recognized by those skilled in the art that the corner brackets 20 in conjunction with the wooden rails 18 materially strengthen the entire chair frame and provide a means for attaching legs to a fully upholstered seating furniture through the simple expedient of tightening a pair of screws for each leg.

Figure 4:
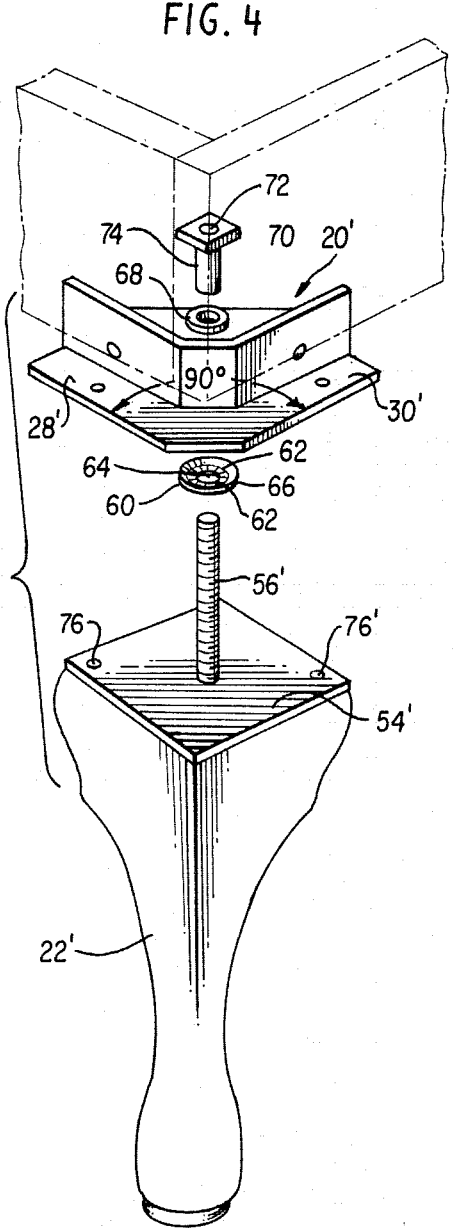
FIG. 4 is a view like FIG. 3 wherein the illustrated corner block receives a threaded nut and the pin projecting from the top surface of a Queen Anne style leg is threaded and the assembly includes a cup or dish-shaped compression member.

As hereinbefore set forth the non-cylindrical legs may be attached by screws and the upstanding pin may be threaded as at 56' FIG. 4 for leg 22' which is identical to leg 22 except that the pin 56' is threaded. The threaded shaft 56' receives a dish or cup-like washer 60 which washer is provided with radial slots 62 which extend from the center opening 64 toward the outer circular edge 66. The corner bracket 20' shown in FIG. 4 of the drawing is constructed with the center central bore in the block 20' for the threaded shaft 56' oversize as at 68 so that the bore can receive a nut 70 having internal threads 72 which mate with the threads on threaded shaft 56'. The nut 70 may have its outer surface configured as at 74 with triangular bosses so that when the nut 70 is forced into the bore 68 the nut is held in place against rotation. The corner bracket 20' illustrated in FIG. 4 makes an angle of 90° between the rail portions 28' and 30' and the bracket 20' is bored to receive attaching screws and screws passing through the bores 76 and 76' in the chair leg 22' as hereinbefore described in reference 2 FIG. 3 of the drawing.

In attaching the threaded non-cylindrical leg 22' FIG. 4 the threaded shaft 56' having the cup or disc-shaped washer 60 thereon is inserted in the bore in the block 20') and then threaded into the in-place nut 70. When the leg is snug with a top surface 54' in contact with the bottom surface of the corner bracket 20' the compression member comprising the cup-shaped washer 60 permits the leg to be rotated approximately 180° flattening the cup-shaped washer to thereby permit the leg to be aligned such that the screw openings 76 and 76' in the leg mate with the corresponding bores in the rail portions 28' and 30'. After the leg is properly aligned with the bracket 20' screws such as 44 and 44' illustrated in FIG. 3 complete the attachment.

Referring now particularly to FIG. 2 of the drawing there is illustrated the attachment of rear leg 24 to the corner bracket 20" which bracket 20" has a pair of wing portions 80 and 82 which engage the bottom edges of the two wooden rails 18 of the bottom frame of the chair. The rails 80 and 82 are each scored as at 84 and 86 which scores form templates for the manufacturer of the chair.

It will be noted that the leg 24 includes a shank portion 88 and a pair of side wing portions 90 and 92 with wing portion 90 being longer than wing portion 92 thus in making the leg there is a left-hand and a right-hand leg as illustrated in FIG. 1. And in assembling the leg the longer wing portion 90 is presented along a side edge of the chair and the shorter wing portion 92 along the back edge of the chair.

Each wing 90 and 92 is bored as at 94 and 96 to receive wood screws 98. Thus when manufacturing the chair for the bracket on the left rear of the chair the manufacturer would bore the scribed opening 84' so that when the leg is attached the screw 98 would pass through bore 96 in the leg and through the bracket 20". Similarly the manufacturer would bore the scribe marked circle 84 in wing 80 to receive a corresponding screw 98 passing through bore 94 in the longer wing of the leg. The corner bracket 20" also has a circular scribe at 100, which locates the position for manufacturer to execute a vertical bore through the bracket into wood element 106, which would form the vertical back support on one side of the chair, which snugly receives the upstanding pin 102 secured in the top surface 104 of leg 24. The leg 24 is thus firmly anchored to the chair via the pin 102 passing through the corner bracket 20" and into the vertical back wooden member 106 plus the two screws 98 which are embedded in side rails 18 of the chair.

Figure 5:
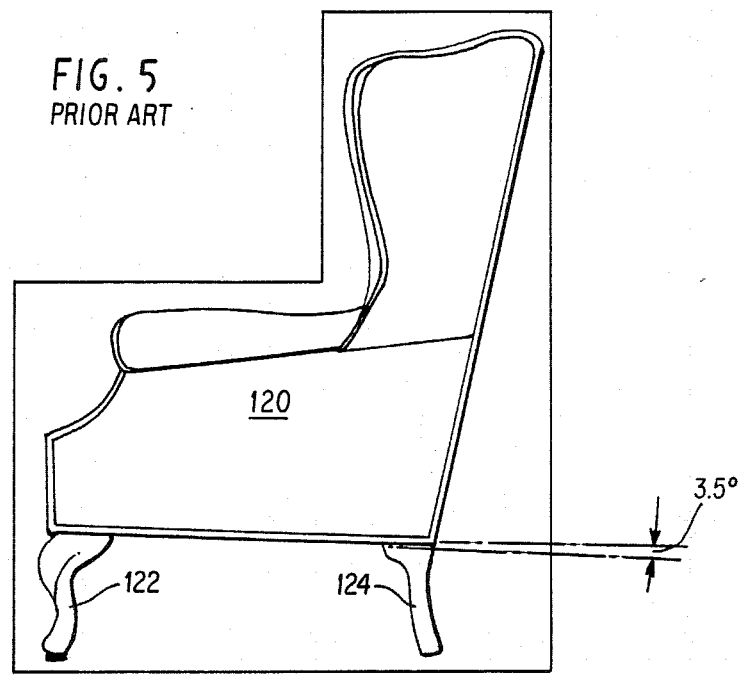
FIG. 5 illustrates a prior art-type chair in a container.

As hereinbefore set forth it is very desirable that chairs and sofas have a rearward slope of 3.5° as illustrated in FIG. 5. In many prior art forms of chair and sofa construction this slope was built into the framing making the framing more difficult to cut and fit. In the present form of construction the front and rear legs 22 and 24 are cast with a length such that when the legs are attached to a chair or sofa the seat is sloped rearwardly 3.5° whereby the manufacturer of the chair can build the frame with the members 18 parallel to the surface of the earth and it is only after the legs are attached that the most comfortable rearward slope of the seat is provided.

Figure 6:
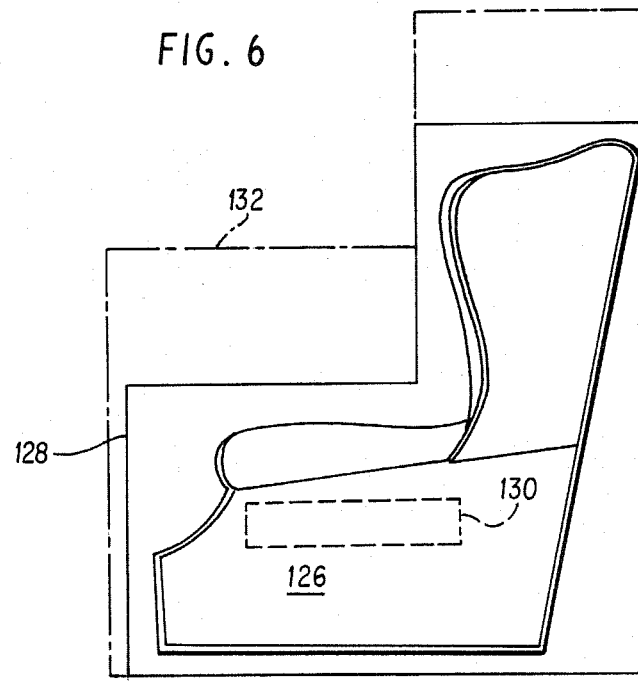
FIG. 6 is a diagrammatic illustration of an equivalent chair provided with the leg system of the present invention to illustrate the saving in packaging space following the principals of the present invention.

Referring now to FIGS. 5 and 6, FIG. 5 illustrates the minimum shipping container for a chair 120 having factory attached legs 120 and 122 and the comfortable 3.5° slope to the seat of the chair. FIG. 6 illustrates applicant's chair 126 in a minimum-sized container 128 and with the front and back legs contained in a package 130 lying on the seat cushion. The broken lines in FIG. 6 designated 132 illustrates that portion of the container illustrated in FIG. 5 not required for shipping a chair constructed in accordance with the present invention. The new shipping container size represents approximately 30 percent of the total shipping volume saved.

From the foregoing description considered in reference to the accompanying drawing those skilled in the art will recognize that various modifications may be made in the detailed embodiment without departing from the scope of the appended claims.

I claim:

1. In an upholstered seating furniture comprising at least a frame, seat and back, a corner block attached to said frame at least at the front corners thereof, a non-cylindrical leg for each corner block, a flat surface forming the entire upper end of each said leg, and upstanding pins secured to the flat upper surface of each leg, each said corner block bored to receive at least said upstanding leg pin, and a pair of screws, bores in the upper end of each leg corresponding in position and diameter to the pair of bores in the corner block, and wherein the frame comprises wood and the corner blocks comprise plastic; and wherein the pair of screws pass through the bores in the corner blocks into the wood frame.

2. The seating furniture as defined in claim 1 wherein the non-cylindrical legs are "Queen Anne".

3. The seating furniture as defined in claim 2 wherein there are front and rear corner blocks and four non-cylindrical legs.

4. The seating furniture as defined in claim 3 wherein the front legs and the rear legs are different.

5. The seating furniture as defined in claim 4 wherein the legs are plastic.

6. The seating furniture as defined in claim 5 wherein the plastic legs are molded or cast to provide a rearward slope to the frame of the seating furniture.

7. The seating furniture as defined in claim 6 wherein the rearward slope is 3.5°.

8. The seating furniture as defined in claim 1 wherein the bore in each corner block to receive the upstanding leg pin is threaded and the upstanding pin secured to the flat surface of each leg is correspondingly threaded.

9. The seating furniture as defined in claim 8 wherein the threaded upstanding pin receives a compression washer.

10. The seating furniture as defined in claim 9 wherein the compression washer is metal and cup-shaped.

11. The seating furniture as defined in claim 10 wherein the cup-shaped washer is provided with slots extending from the inner bore radially outwardly.

12. The seating furniture defined in claim 1 wherein the corner block is formed with a 90° corner.

13. The seating furniture as defined in claim 1 wherein the corner block is formed with a corner of 86.5°.

14. The seating furniture as defined in claim 13 wherein the rear corner block is formed with a corner of 93.5°.

* * * * *